United States Patent
Hayden et al.

(10) Patent No.: US 9,863,258 B2
(45) Date of Patent: Jan. 9, 2018

(54) METHOD OF FORMING A STRUCTURAL CONNECTION BETWEEN A SPAR CAP AND A FAIRING FOR A WIND TURBINE BLADE

(71) Applicant: Blade Dynamics Limited, Cowes, Isle of Wight (GB)

(72) Inventors: Paul Hayden, Cowes (GB); Harald Behmer, Newport (GB)

(73) Assignee: Blade Dynamics Limited, Cowes, Isle of Wright (GB)

( * ) Notice: Subject to any disclaimer, the term of this patent is extended or adjusted under 35 U.S.C. 154(b) by 317 days.

(21) Appl. No.: 14/667,538

(22) Filed: Mar. 24, 2015

(65) Prior Publication Data

US 2015/0198051 A1 Jul. 16, 2015

Related U.S. Application Data (63) Continuation of application No. PCT/GB2013/052508, filed on Sep. 26, 2013.

(30) Foreign Application Priority Data

Sep. 26, 2012 (GB) .................................. 1217210.2

(51) Int. Cl.
*F01D 5/28* (2006.01)
*B29C 70/84* (2006.01)
(Continued)

(52) U.S. Cl.
CPC .............. *F01D 5/282* (2013.01); *B29C 70/84* (2013.01); *B32B 37/1027* (2013.01);
(Continued)

(58) Field of Classification Search
CPC ........ F01D 5/282; F01D 5/147; F03D 1/0633; F03D 1/0641; F03D 1/065; F03D 1/0675;
(Continued)

(56) References Cited

U.S. PATENT DOCUMENTS 2,767,461 A 10/1956 Lebold et al.
3,531,901 A 5/1966 Will, Jr. et al.
(Continued)

FOREIGN PATENT DOCUMENTS

CN 101560945 A 10/2009
DE 3811427 5/1988
(Continued)

OTHER PUBLICATIONS

Parabeam 3D, Parabeam, May 14, 2012, YouTube, Retrieved from the internet on Mar. 29, 2017 (URL: https://youtu.be/FSAgsiFp_G4).*
(Continued)

*Primary Examiner* — Dwayne J White
*Assistant Examiner* — Sang K Kim
(74) *Attorney, Agent, or Firm* — Dority & Manning, P.A.

(57) ABSTRACT

A method of forming a structural connection between a spar cap 14 and an aerodynamic fairing 12. A composite comprising an uncured matrix and a compressible solid is applied between the spar cap and fairing and is then compressed and cured to adhere the fairing to the spar cap. The cured matrix composite has a void volume of at least 20%. The high void volume means that as the fairing is compressed into place and compresses the composite, it has space in which to deform so as not to place undue stress on the fairing and to produce a lightweight connection.

22 Claims, 7 Drawing Sheets

(51) Int. Cl.
  *B32B 37/10* (2006.01)
  *B32B 37/12* (2006.01)
  *B32B 37/18* (2006.01)
  *F01D 5/14* (2006.01)
  *B29L 31/08* (2006.01)

(52) U.S. Cl.
  CPC .............. *B32B 37/12* (2013.01); *B32B 37/18* (2013.01); *F01D 5/147* (2013.01); *B29L 2031/085* (2013.01); *B32B 2037/1253* (2013.01); *B32B 2305/07* (2013.01); *B32B 2305/77* (2013.01); *B32B 2603/00* (2013.01); *F05D 2230/60* (2013.01); *Y02E 10/721* (2013.01); *Y02P 70/523* (2015.11); *Y10T 156/10* (2015.01)

(58) Field of Classification Search
  CPC ... F03D 1/0683; F05D 2230/60; B29C 70/84; B32B 37/1027; B32B 37/12; B32B 37/18; B32B 2037/153; B32B 2305/07; B32B 2305/77; B32B 2603/00; Y02E 10/721; Y02P 70/523; Y10T 156/10; B29L 2031/085
  See application file for complete search history.

(56) References Cited

U.S. PATENT DOCUMENTS

| | | | |
|---|---|---|---|
| 3,487,518 A | 1/1970 | Hopefield | |
| 3,980,894 A | 9/1976 | Vary et al. | |
| 4,120,998 A | 10/1978 | Olez | |
| 4,557,666 A | 12/1985 | Baskin et al. | |
| 4,580,380 A | 4/1986 | Ballard | |
| 4,643,646 A | 2/1987 | Hahn et al. | |
| 4,662,587 A | 5/1987 | Whitener | |
| 4,732,542 A | 3/1988 | Hahn et al. | |
| 4,752,513 A | 6/1988 | Rau et al. | |
| 4,976,587 A | 12/1990 | Farone et al. | |
| 5,096,384 A | 3/1992 | Immell et al. | |
| 5,145,320 A | 9/1992 | Blake et al. | |
| 5,273,819 A | 12/1993 | Jex | |
| 5,281,454 A | 1/1994 | Hanson | |
| 5,670,109 A | 9/1997 | Derees | |
| 5,735,486 A | 4/1998 | Piening et al. | |
| 5,863,635 A | 1/1999 | Childress | |
| 6,139,278 A | 10/2000 | Mowbray et al. | |
| 6,287,666 B1 | 9/2001 | Wycech | |
| 6,295,779 B1 | 10/2001 | Canfield | |
| 6,332,301 B1 | 12/2001 | Goldzak | |
| 7,267,868 B2 | 9/2007 | Gallet et al. | |
| 7,371,304 B2 | 5/2008 | Christman et al. | |
| 7,413,623 B2* | 8/2008 | Raday ................... | B29B 15/122 156/169 |
| 7,438,524 B2 | 10/2008 | Lyders et al. | |
| 7,625,185 B2 | 12/2009 | Wobben | |
| 7,810,757 B2 | 10/2010 | Kirkwood et al. | |
| 7,976,275 B2 | 7/2011 | Miebach et al. | |
| 8,012,229 B1 | 9/2011 | Hancock | |
| 8,079,818 B2 | 12/2011 | Burchardt et al. | |
| 8,172,542 B2 | 5/2012 | Hirano et al. | |
| 8,382,440 B2* | 2/2013 | Baker ................... | F03D 1/0675 416/226 |
| 8,500,408 B2 | 8/2013 | Baker et al. | |
| 8,764,401 B2 | 7/2014 | Hayden et al. | |
| 8,905,718 B2 | 12/2014 | Hayden et al. | |
| 2002/0053179 A1 | 4/2002 | Wycech | |
| 2004/0018091 A1 | 1/2004 | Rongong et al. | |
| 2004/0023581 A1 | 2/2004 | Bersuch et al. | |
| 2004/0226255 A1 | 11/2004 | Holloway | |
| 2005/0106029 A1 | 5/2005 | Kidegaard | |
| 2006/0070340 A1 | 4/2006 | Fanucci et al. | |
| 2006/0083611 A1 | 4/2006 | Wobben | |
| 2006/0127222 A1* | 6/2006 | Arelt ................... | F03D 1/0675 416/224 |
| 2006/0152011 A1 | 7/2006 | Fraenkel | |
| 2007/0036659 A1 | 2/2007 | Hibbard | |
| 2007/0140861 A1 | 6/2007 | Wobben | |
| 2007/0189903 A1 | 8/2007 | Eyb | |
| 2007/0264124 A1 | 11/2007 | Mueller et al. | |
| 2008/0069699 A1 | 3/2008 | Bech | |
| 2008/0075603 A1 | 3/2008 | Van Breugel | |
| 2009/0068017 A1 | 3/2009 | Rudling | |
| 2009/0075084 A1 | 3/2009 | Kochi et al. | |
| 2009/0162206 A1 | 6/2009 | Zirin et al. | |
| 2009/0162208 A1 | 6/2009 | Zirin et al. | |
| 2009/0211173 A1* | 8/2009 | Willey ................... | B29C 70/222 52/40 |
| 2009/0226320 A1 | 9/2009 | Martinez | |
| 2009/0226702 A1 | 9/2009 | Madsen et al. | |
| 2009/0246446 A1 | 10/2009 | Backhouse | |
| 2009/0252614 A1 | 10/2009 | Schibsbye | |
| 2010/0062238 A1 | 3/2010 | Doyle et al. | |
| 2010/0084079 A1 | 4/2010 | Hayden et al. | |
| 2010/0086409 A1 | 4/2010 | Whiley et al. | |
| 2010/0116938 A1 | 5/2010 | Kline | |
| 2010/0132884 A1 | 6/2010 | Baehmann | |
| 2010/0135817 A1 | 6/2010 | Wirt et al. | |
| 2010/0140947 A1 | 6/2010 | McEntee et al. | |
| 2010/0143143 A1 | 6/2010 | Judge | |
| 2010/0143146 A1 | 6/2010 | Bell et al. | |
| 2010/0162567 A1 | 7/2010 | Kirkwood et al. | |
| 2010/0213644 A1* | 8/2010 | Driver ................... | B29C 70/44 264/553 |
| 2010/0310379 A1 | 12/2010 | Licingston | |
| 2011/0008175 A1* | 1/2011 | Gau ................... | F03D 1/0675 416/233 |
| 2011/0036495 A1 | 2/2011 | Cinquin | |
| 2011/0138707 A1 | 6/2011 | Bagepalli | |
| 2011/0175365 A1 | 7/2011 | Hines et al. | |
| 2011/0176915 A1 | 7/2011 | Keir et al. | |
| 2012/0027610 A1 | 2/2012 | Yarbrough | |
| 2012/0027613 A1* | 2/2012 | Yarbrough .............. | F03D 1/065 416/226 |
| 2012/0045343 A1 | 2/2012 | Hancock et al. | |
| 2012/0141283 A1 | 6/2012 | Bell et al. | |
| 2012/0294724 A1 | 11/2012 | Broome et al. | |
| 2013/0022472 A1 | 1/2013 | Hayden et al. | |
| 2013/0217283 A1* | 8/2013 | Arai ....................... | C08G 59/28 442/59 |
| 2013/0340384 A1 | 12/2013 | Hayden et al. | |
| 2013/0340385 A1 | 12/2013 | Hayden et al. | |
| 2014/0086752 A1 | 3/2014 | Hayden et al. | |
| 2014/0234109 A1 | 8/2014 | Hayden et al. | |

FOREIGN PATENT DOCUMENTS

| | | |
|---|---|---|
| DE | 19737966 | 8/1998 |
| DE | 102 35 496 | 2/2004 |
| DE | 203 20 714 U1 | 1/2005 |
| DE | 10 2008 055540 | 6/2009 |
| EP | 8 863 358 | 9/1998 |
| EP | 1 262 614 A2 | 12/2002 |
| EP | 1 880 833 | 1/2008 |
| EP | 2 111 971 A2 | 10/2009 |
| EP | 2 186 622 | 5/2010 |
| EP | 2 341 240 A1 | 7/2011 |
| EP | 2 400 147 A1 | 12/2011 |
| FR | 2 710 871 A1 | 4/1995 |
| FR | 2 863 321 A1 | 6/2005 |
| FR | 2 919 819 | 2/2009 |
| GB | 1229595 | 4/1971 |
| GB | 2041829 | 9/1980 |
| GB | 2372784 A | 9/2002 |
| GB | 2473448 A | 3/2011 |
| JP | 2000-120524 A | 4/2000 |
| JP | 2006-248456 A | 9/2006 |
| JP | 2006-336555 A | 12/2006 |
| JP | 2007-209923 | 8/2007 |
| KR | 2012-0077650 A | 7/2012 |
| WO | WO 97/30651 | 8/1997 |
| WO | WO 2003/035380 | 5/2003 |
| WO | WO 03/057457 A1 | 7/2003 |

(56) References Cited

FOREIGN PATENT DOCUMENTS

| WO | WO 03/069099 A1 | 8/2003 |
|---|---|---|
| WO | WO 2004/029448 | 4/2004 |
| WO | WO 2004/088130 A1 | 10/2004 |
| WO | WO 2005/011964 | 2/2005 |
| WO | WO 2006/002621 | 1/2006 |
| WO | WO 2007/073735 A1 | 7/2007 |
| WO | WO 2008/003330 A1 | 1/2008 |
| WO | WO 2009/034291 | 7/2008 |
| WO | WO 2008/131800 A1 | 11/2008 |
| WO | WO 2008/136717 A1 | 11/2008 |
| WO | WO 2009/077192 | 6/2009 |
| WO | WO 2009/126996 | 10/2009 |
| WO | WO 2009/130467 | 10/2009 |
| WO | WO 2010/023140 | 3/2010 |
| WO | WO 2010/092168 A2 | 8/2010 |
| WO | WO 2010/114794 | 10/2010 |
| WO | WO 2011/064553 A2 | 6/2011 |
| WO | WO 2011/067323 A2 | 6/2011 |
| WO | WO 2011/092474 A2 | 8/2011 |
| WO | WO 2011/106733 | 9/2011 |
| WO | WO 2012/004571 | 1/2012 |
| WO | WO 2012/164305 | 1/2012 |
| WO | WO 2012/061710 A2 | 5/2012 |
| WO | WO 2013/061016 A1 | 5/2013 |
| WO | WO 2014/030007 A1 | 2/2014 |
| WO | WO 2014/049330 A1 | 4/2014 |
| WO | WO 2014/049354 A1 | 4/2014 |

OTHER PUBLICATIONS

Unofficial English Translation of Chinese Office Action issued in connection with corresponding CN Application No. 201380050161.5 on May 10, 2016.

Jackson K J et al: Innovative Design approaches for large wind turbine blades, Wind Energy, Wiley, Chichester, GB, vol , No. 2, Apr. 1, 2005 (Apr. 1, 2005), pp. 141-171, XP002440739, ISSN: 1099=1824, DOI: 10.1002WE.128, p. 142, p. 146-p. 150, figures 1, 5, table 1.

TPI Composites, Sandia National Laboratories: "Innovative Design Approaches for Large Wind Turbine Blades", Albuquerque, New Mexico, Mar. 21, 2003 (Mar. 31, 2003), XP002682109, Retrieved from the Internet: URL: http://prod.sandia.gov/techlib/access-control.cgi/2003/030723.pdf [retrieved on Aug. 21, 2012], pp. 20-21, figure 3.3, table 3/1.

International Search Report and Written Opinion in corresponding PCT Application No. PCT/GB2013/052508 dated Jan. 2, 2014, 9 pgs.

Search Report in corresponding UK Application No. GB1217210.2, dated Feb. 1, 2013, 3 pgs.

\* cited by examiner

PRIOR ART

METHOD OF FORMING A STRUCTURAL CONNECTION BETWEEN A SPAR CAP AND A FAIRING FOR A WIND TURBINE BLADE

INCORPORATION BY REFERENCE TO ANY PRIORITY APPLICATIONS

This application is a continuation of Patent Cooperation Treaty International Patent Application PCT/GB2013/052508, filed Sep. 26, 2013, and entitled "A METHOD OF FORMING A STRUCTURAL CONNECTION BETWEEN A SPAR CAP AND A FAIRING FOR A WIND TURBINE BLADE," which is incorporated by reference herein in its entirety, and which claims priority to United Kingdom Patent Application GB1217210.2, filed on Sep. 26, 2012.

BACKGROUND

Field

The present invention relates to a method of forming a structural connection between a spar and an aerodynamic fairing and in particular to a spar and an aerodynamic fairing for a wind turbine blade.

Description of the Related Art

Modern wind turbine blades are typically made by separately manufacturing a structural beam or spar which extends along the length of the blade and two half shells, or aerodynamic fairings, which are attached to the spar to define the aerodynamic profile of the blade.

Figure 1A:
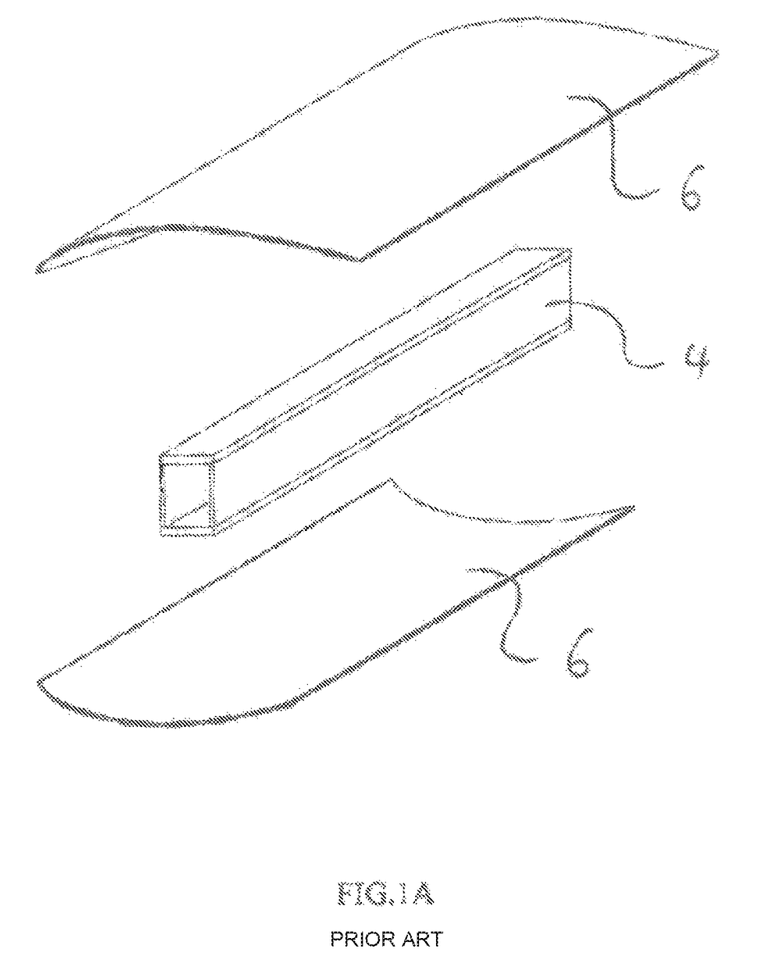
FIGS. 1A to 1C are schematic views of a fairing and a spar of a wind turbine blade connected using a conventional method.
Figure 1B:
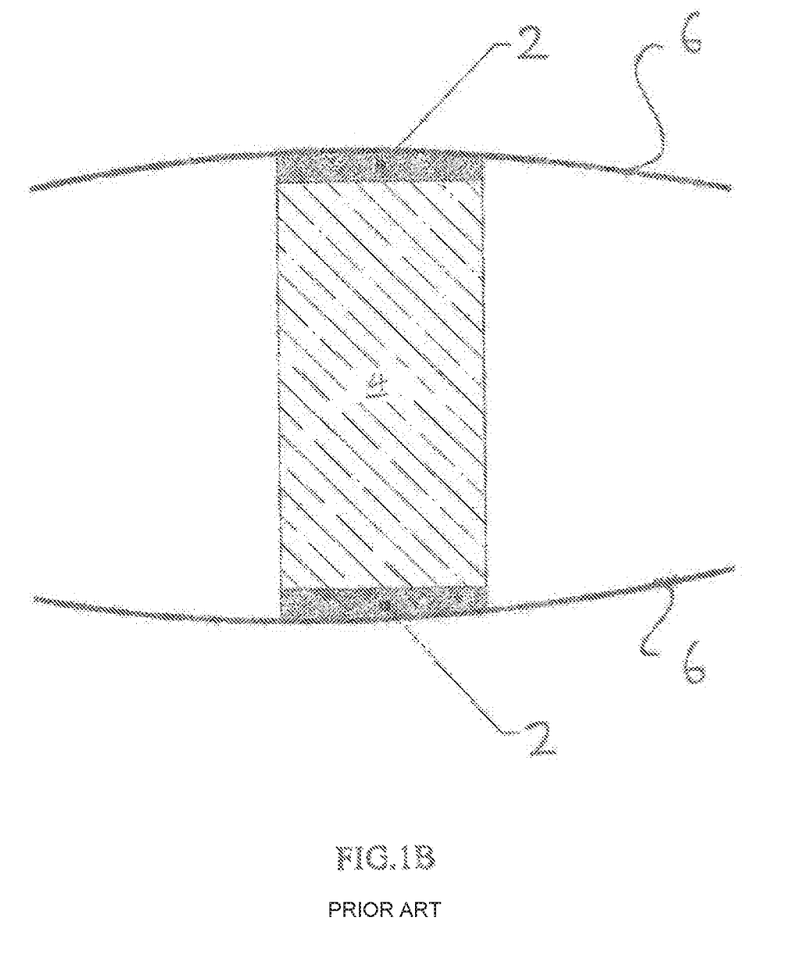
Figure 1C:
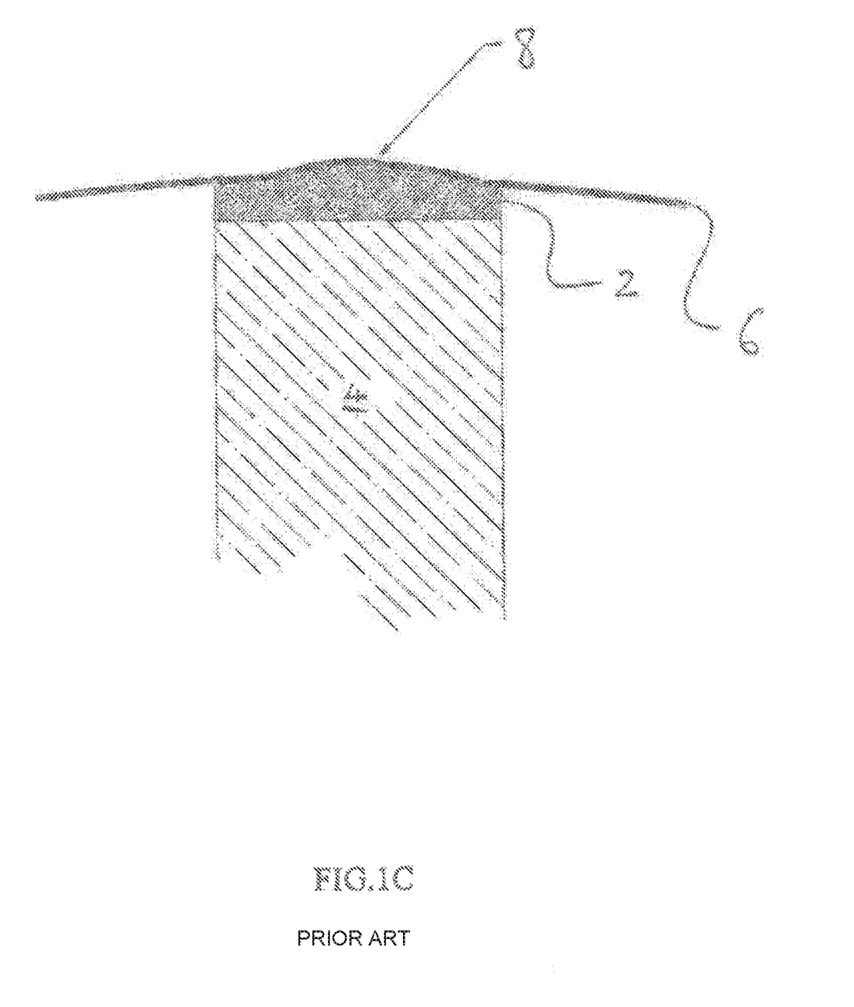

A typical method of attaching the fairings to the spar is shown in FIGS. 1A-1C. In this method, an adhesive 2 is applied to the upper and lower surfaces of the spar 4 and the fairings 6 are placed over the adhesive 2 to enclose the spar 4, as shown in FIG. 1B. Typically, a cavity with a thickness of between 5 mm and 50 mm will exist between the upper and lower surfaces of the spar 4 and fairings 6, and the adhesive 2 fills this cavity. The fairings 6 are then clamped against the spar 4 to squeeze the adhesive 2 and bond the fairings 6 to the spar 4. As the forces required to squeeze the adhesive 2 are high, the fairings 6 are typically kept in the tools in which they were formed for the step of bonding each fairing 6 to the spar 4.

However, as the fairings 6 are pressed against the spar 4, the adhesive applies pressure to the inner surface of the fairings 6. This can lead to distortion of the fairings 6 and the tools (not shown) in which they are held, resulting in a distorted aerodynamic surface 8, as shown in FIG. 1C. Thus, the tools must be of sufficient structural stiffness to prevent such distortion.

Although acceptable for smaller blades, the above technique can be extremely expensive when used to bond larger blades, such as those which are 45 meters or more in length. This is due to the cost of building a tool large enough to accommodate the fairings, stiff enough not to distort, and which can be lifted and closed accurately.

US 2009/0226702 is directed to an adhesive joint for use in joining various wind turbine components. This document recognises a problem with excessive adhesive used in these joints. In particular, it is not possible to remove this excess adhesive in a closed structure. Such excess adhesive may break off in use and cause problems such as clogging drainage holes and causing damaging impact forces. In order to overcome this problem, this document proposes providing a porous layer which extends beyond the adhesive joint. Once the space in the region of the joint around the porous member is fully filled with adhesive, excess adhesive will be squeezed into the parts of the porous layer outside of the joint. It is then retained during use within this porous layer and the problems of the loose lumps of adhesive are solved. The document does not address the assured distortion of the fairings and tools which is addressed by the present invention.

SUMMARY

According to a first aspect of the present invention, there is provided a method of forming a structural connection between a spar cap and an aerodynamic fairing for a wind turbine blade, comprising the steps of applying a composite between the spar cap and the fairing, the composite comprising an uncured matrix and a compressible solid, compressing the deformable solid so that the composite substantially occupies a space between the spar cap and the fairing, curing the matrix to maintain the compressible solid in its compressed state with the composite having a void volume of at least 30%, and adhering the fairing to the spar cap as the matrix is cured.

With this arrangement, the composite applies a pressure to the spar cap and the inside surface of the fairing which is sufficient to ensure that the bonding surfaces are well connected but which is low enough to prevent distortion of the fairing during assembly. The relatively low pressure exerted by the composite is largely a factor of the significant void volume. This means not only that the matrix must have a relatively low density, but also readily allows the matrix to be compressed as there is ample space into which the deformable material can be depressed without creating undue resistance against the fairing. The void volume also helps to reduce the weight of the joint.

A void volume of at least 20% allows the low pressure advantage set out above. However, in practice, the void volume can be significantly higher provided that the structural integrity of the joint is maintained. Lower void volumes provide additional weight benefits. Thus, the void volume may preferably be greater than 30%, preferably greater than 40%, preferably greater than 50%, preferably greater than 60%, preferably greater than 70%.

Also, unevenness in the fairing, spar, or composite can be smoothed out by the compressible solid as it deforms in the space between the spar cap and fairing. For example, where the space between fairing and spar cap is locally reduced, the compressible solid will be compressed more, whereas an incompressible traditional adhesive is likely to distort the fairing. Thus, a sound structural connection can be formed without inducing large or uneven pressures on the fairing.

Further, by curing the matrix to hold the compressible solid in its deformed state, the composite can provide a structural connection between the fairing and the spar cap which resists buckling of the fairing.

The adhering of the fairing to the spar cap may be carried out by the matrix. The matrix may comprise an epoxy resin and/or a structural adhesive.

Alternatively, an additional adhesive may be provided, wherein the adhering of the fairing to the spar cap is carried out at least in part by the additional adhesive. This will increase the adhesion between the fairing, composite and spar cap.

In a preferred embodiment, the matrix is non-foaming. This prevents excessive expansion of the composite which may lead to fairing distortion.

The deformable solid is preferably approximately 20% thicker than the widest part of the cavity when in an uncompressed state.

Any suitable compressible solid may be used, although preferably the compressible solid comprises a first porous layer facing the fairing and a second porous layer facing the spar cap, the first and second porous layers being separated by a third layer which has a greater thickness and a lower density that the first and second layers.

Thus, this low density layer forms a significant proportion of the compressible solid and its lower density allows for the void volume. The relatively high density of the first and second layers which are porous means that resin or adhesive from the third layer can pass through the first and second layers into contact with the fairing and spar cap respectively, providing a large surface area which bonds with the fairing and spar cap respectively.

The first and second layers may be of any material which provides a relatively high surface area and allows the adhesive to pass through, such as a moulded plastic mesh. However, they are preferably a fibrous structure which may be a non-woven felt-like structure, but is preferably woven.

The third layer may be any compressible material which can support the upper and lower layers in their uncompressed state and which, in situ, has a high enough void space so that once the matrix is applied and the composite is compressed and cured, it is able to provide the required void volume. The third layer in its uncompressed state and prior to application of the matrix preferably has a void volume of at least 30%, more preferably 40% and most preferably 50%. The third layer may, for example, be an open cell foam, but is preferably formed of fibres which are woven or stitched between the first and second layers. For such a structure, the fibres of the third layer are generally perpendicular to the first and second layers such that, in use, they will bridge the gap between the fairing and spar cap thereby providing good support for the fairing once the matrix has cured.

The composite may be formed by adding the matrix once the three-dimensional fabric has been placed between the fairing and the spar cap. In a preferred embodiment, the three-dimensional fabric is impregnated with the matrix prior to the step of applying the composite between the spar cap and the fairing. This simplifies the assembly process. One way of applying the matrix is to pass the compressible solid through a bath containing the matrix. The impregnated composite is then passed through a pair of rollers, the space between which can be adjusted to squeeze the composite to a greater or lesser extent thereby removing as much of the matrix as necessary to achieve the required void volume in the finished product.

The method is suitable to produce a wind turbine blade of any length. In a preferred embodiment, the blade is at least 45 meters in length.

According to a second aspect of the present invention, there is provided a wind turbine blade comprising a spar with at least one spar cap, a fairing positioned over the spar cap, and a composite which substantially fills a space between the spar cap and the fairing, wherein the composite comprises a cured matrix, a compressed solid and a void volume of at least 20%.

The composite may be arranged to adhere the spar cap to the fairing. This reduces the assembly steps required. Alternatively, the blade further comprises an additional adhesive arranged to at least partially adhere the spar cap to the fairing. This supplements any adhesion provided by the composite, or, in the case where substantially no adhesion is provided by the composite, provides the adhesion.

BRIEF DESCRIPTION OF THE DRAWINGS

A preferred embodiment of the invention will now be described, by way of example only, with reference to the accompanying drawings in which.

DETAILED DESCRIPTION

Figure 2:
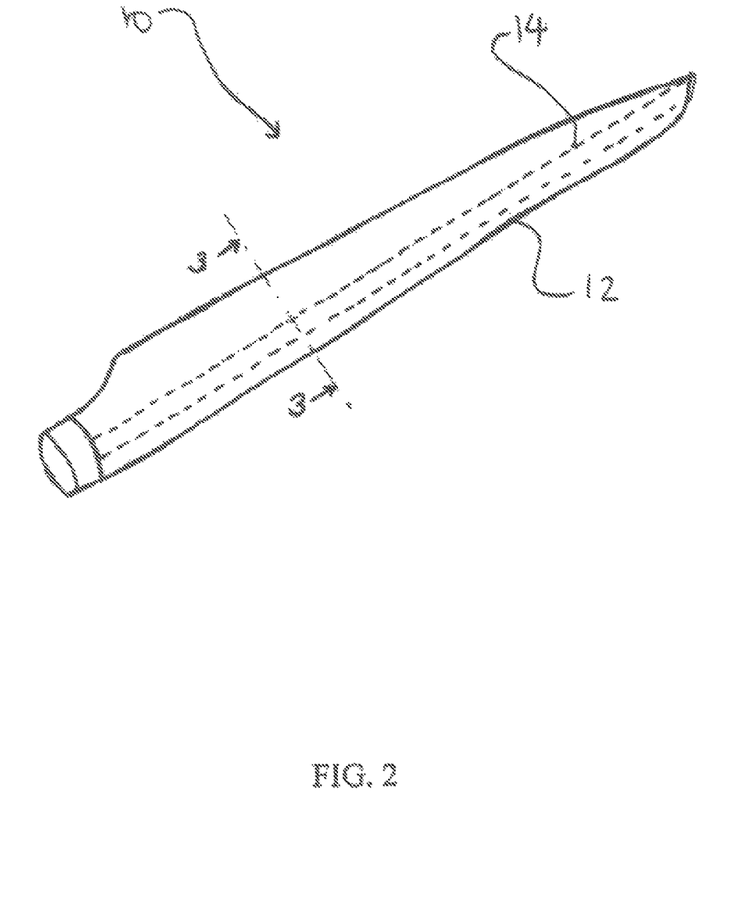
FIG. 2 is a perspective view of a wind turbine blade according to the present invention.

Referring to FIG. 2, the wind turbine blade 10 has an aerodynamic fairing 12 which encloses and is attached to a structural spar 14 extending along the length of the blade 10. The aerodynamic fairing 12 is a semi-rigid structure, such as a GFRP comprising fibreglass fibres, for instance PPG Hybon® 2002, and a supporting matrix of epoxy resin, for instance Dow Airstone® 780.

Figure 3:
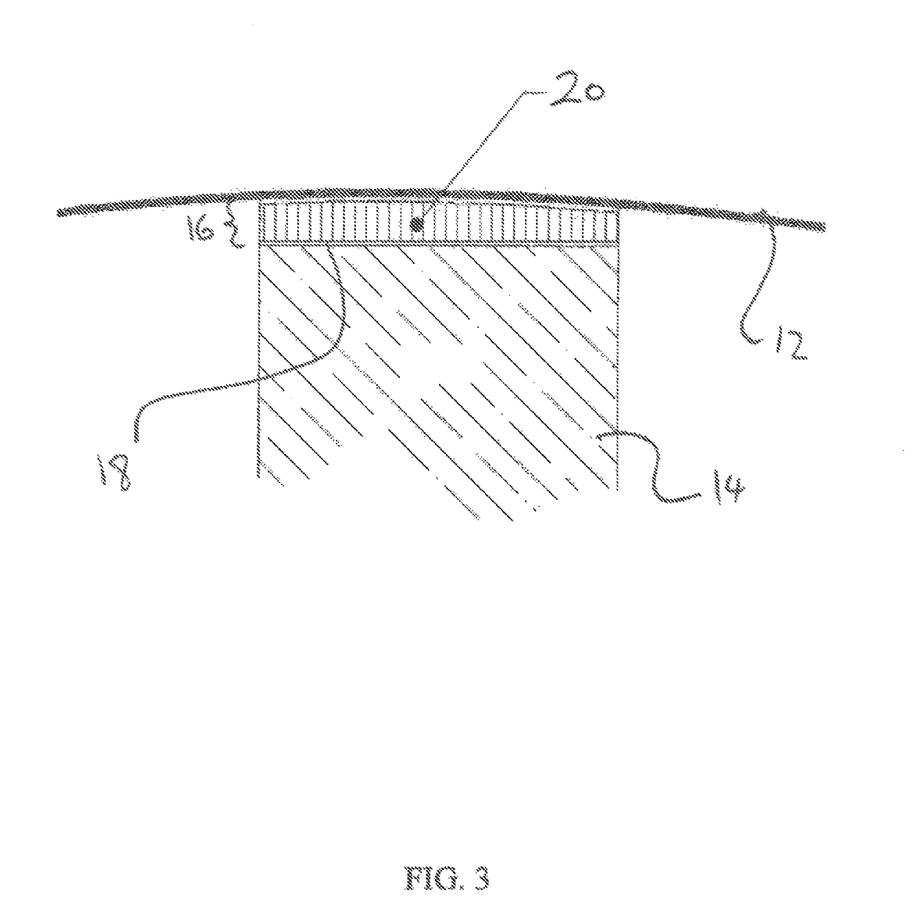
FIG. 3 is a schematic partial section view through line 3-3 of FIG. 2, showing the structural connection between fairing and spar.

As shown in FIG. 3, the fairing 12 is positioned over the spar 14 such that a cavity 16 is defined between the fairing 12 and a spar cap 18 at the upper surface of the spar 14. A composite 20 is disposed between the fairing 12 and the spar cap 18 and substantially fills the cavity 16. The composite 20 comprises a three-dimensional woven fibreglass fabric, such as Parabeam® PG18, and a cured supporting matrix of epoxy resin, such as Dow Airstone® 780, which is bonded to both the fairing 12 and the spar cap 18 to form a structural connection between the fairing 12 and the spar 14. By "structural connection" it is meant that the composite 20 forms a connection with sufficient shear strength, compressive strength, adhesion and compressive stiffness that the fairing 12 remains attached to the spar 14 during use and is not caused to buckle by the forces induced on the blade 10 during use.

Figure 4:
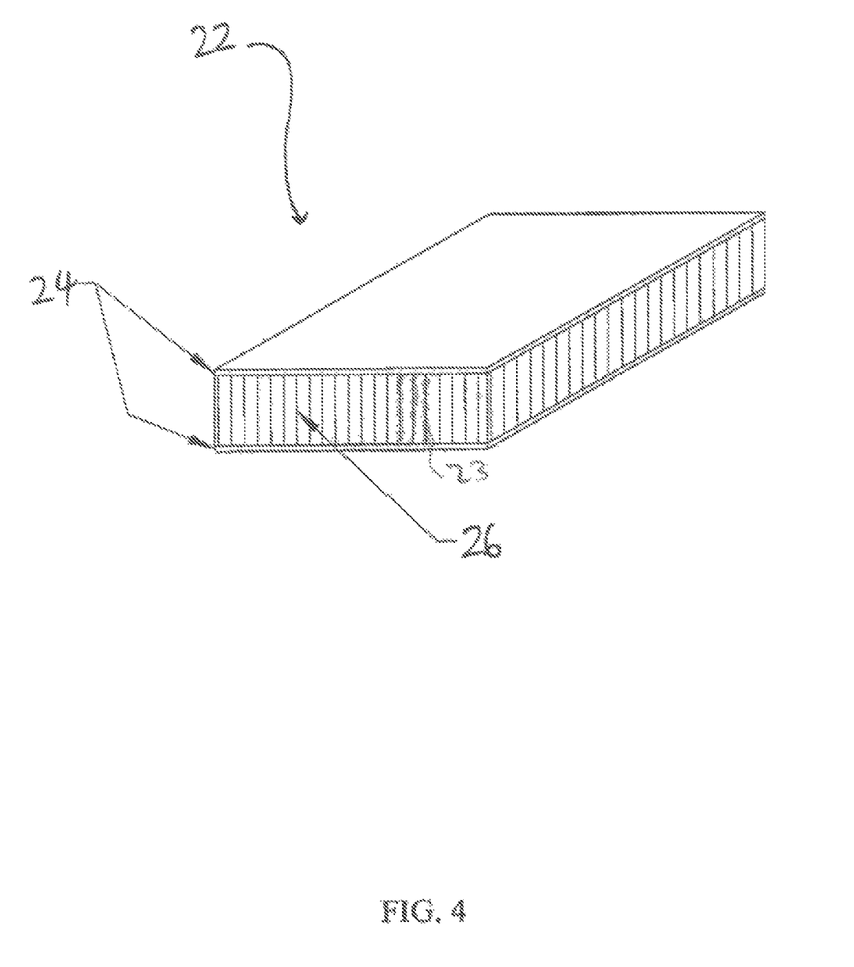
FIG. 4 is a schematic perspective view of a deformable solid for use with the blade of FIG. 2.

With reference to FIG. 4, the three-dimensional fabric 22 comprises two substantially parallel fibrous face sheets 24 between which extend resilient connecting fibres 26 woven into the face sheets 24. The fibres 26 are arranged to provide a very high void space between the first and second sheets (in this case, 94-97%). This is a measure of the total volume occupied by the air between the sheets 24 as a percentage of the total volume between the sheets 24. A space entirely filled with fibres, would represent a void volume of 0%, while the absence of any fibres represents a void volume of 100%. This is a measure of the void space in the uncompressed fabric prior to the application of the resin.

To form the structural connection, a layer of the three dimensional fabric 22, which is thicker than the cavity 16, is pre-impregnated with an uncured epoxy resin 23. This is done by passing the fabric through a bath of uncured resin and then passing the coated fabric through the pair of rollers. This allows the gap between the rollers to be adjusted to achieve the required amount of resin desired to give the required void space in the finished article. The resin will cling to the fibres (as shown in FIG. 4 which shows just three such coated fibres—the remainder will be coated in practice), but does not fill the space between the sheets 24. The density of the sheets 24 is such that most, if not all, of the space between the fibres in the sheets 24 is filled by the resin in order to ensure a good contact surface to both the spar 14 and fairing 12.

The composite is placed on the spar cap 18 of the spar 14. In this example, the layer of fabric 22 is approximately 20% thicker than the widest point of the cavity 16. The fairing 12 is then placed over the composite 20 to form the cavity 16 and held in place by assembly jigs (not shown) until the resin has cured to form the structural connection.

As the connecting fibres 26 of the fabric 22 are deformable, the uncured composite 20 behaves like a mattress and can be likened to an elastic foundation. Thus, the composite 20 is compressed between the fairing 12 and the spar cap 18 such that it takes the shape of the cavity 16. When compressed, the fabric 22 of the composite 20 applies an even pressure to the inside of the fairing 12 which is sufficient to ensure that bonding surfaces are well connected but not so great that the aerodynamic surface of the fairing 12 is distorted. In this manner, the structural connection is formed without the need to apply large external forces to squeeze the adhesive and risk damaging the tooling and fairing 12.

Once the resin has cured, the hardened composite 20 should form a sufficient structural connection between the spar 14 and the fairing 12. In other words, the structural properties of the fabric 22 and the resin should be selected such that the cured composite 20 has sufficient shear strength, compressive strength, and compressive stiffness characteristics for a given installation. In this manner, the fairing 12 will remain attached to the spar cap 18 and can resist buckling which may otherwise result during use of the blade 10.

In order to provide the required deformability and compressive strength in the finished article, the composite should have a void volume of at least 30% in its compressed and cured state. In this example, the void space is 80%. The cured, compressed material preferably has a density of 160-300 kg/m$^3$. This allows plenty of space for the fabric to deform when compressed as set out above. It should be noted that the void volume is the void volume of the composite material. Any region of the material which contains only fibres and no matrix material is a single phase material and not composite. Thus, any such regions are excluded when determining the void volume. Thus, for example, US 2009/0226702 has certain regions which have a 0% void volume where the adhesive is present and other regions where only the porous layer is present which do not represent part of the composite.

To allow the fairing 12 to be connected to the structural spar 14 without any significant deformation, the relationship between the stiffness of the fairing 12 and that of the composite 20 in its uncured state should be in the region of:

$$\frac{K_s}{K_f} \leq 1.25^{-10}$$

Where:

$K_s$ is the foundation stiffness of the composite 20 in its uncured state, in this case corresponding to the stiffness of the fabric 22, measured as elastic modulus per unit thickness (Pa/M) and defined as the quotient of the elastic modulus of the foundation material and the total thickness of the foundation material; and $K_f$ is the bending stiffness of the fairing 12, measured in units of pressure (Pa) and defined as the product of the elastic modulus and area moment of inertia of the constitutive elements of the fairing 12. Bending stiffness can also be considered as a structure's resistance to curvature under an applied loading.

Figure 5:
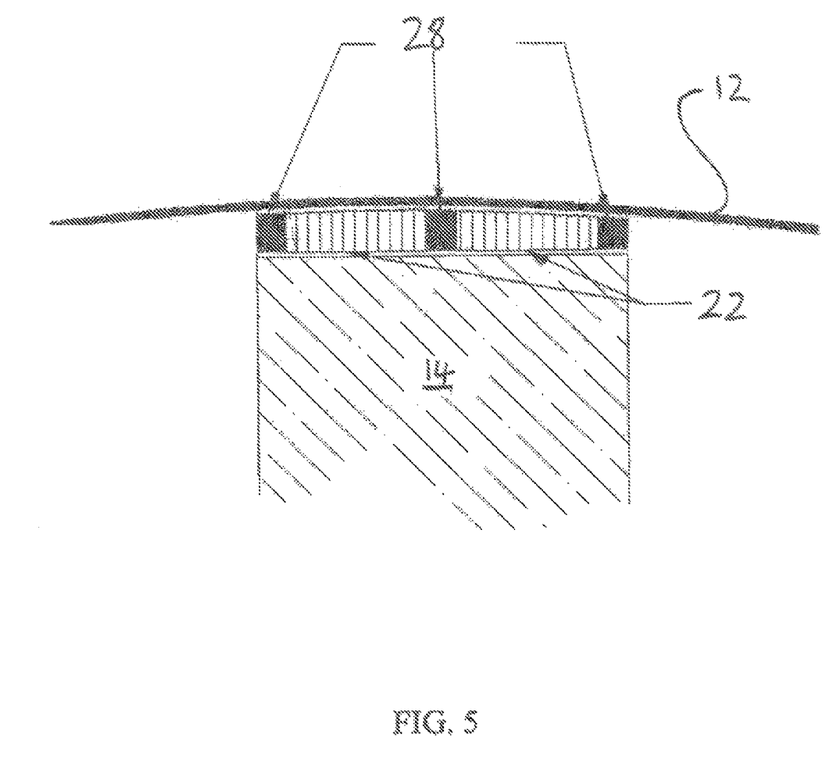
FIG. 5 is a schematic partial section view of a first alternative structural connection between fairing and spar, showing the deformable solid in a deformed state.

Referring to FIG. 5, a traditional structural adhesive 28, such as a regular filled epoxy adhesive, could be applied to the three dimensional fabric 22 to assist in the bonding of the fairing 12 to the spar 14.

Although the spar has been described as comprising a spar cap, it may be a simple beam, for example a box-section beam.

Rather than being formed from upper and lower shells, the aerodynamic fairing could be formed from any number of shells.

Although the deformable solid has been described in the first embodiment as a three dimensional fabric, any suitable resilient and compressible material may be used.

In addition, although the composite has been described as three dimensional fabric with a resin matrix, the matrix could be a structural adhesive.

The uncompressed thickness of the three dimensional fabric could be more or less than 20% thicker than the thickness of the cavity between fairing and spar, depending on the compressibility characteristics of the fabric.

Although the three dimensional fabric is described as being pre-impregnated with resin, the resin could be added to the fabric in situ, for example by injecting into the cavity between fairing and spar cap while they are held in place by the assembly jig.

The composite could be placed on the fairing prior to placing the fairing on the spar cap, rather than being placed on the spar cap.

What is claimed is:

1. A method of forming a structural connection between a spar cap and an aerodynamic fairing for a wind turbine blade, the method comprising:
   applying a composite between the spar cap and the fairing, the composite comprising an uncured matrix and a compressible solid;
   compressing the compressible solid so that composite substantially occupies a space between the spar cap and the fairing;
   curing the uncured matrix to maintain the compressible solid in its compressed state with the composite having a void volume of at least 20%, the void volume absent of the matrix and the compressible solid; and
   adhering the fairing to the spar cap as the matrix is cured.

2. A method according to claim 1, wherein the void volume is at least 30%.

3. A method according to claim 1, wherein the adhering of the fairing to the spar cap is carried out by the matrix.

4. A method according to claim 1, wherein the matrix comprises an epoxy resin.

5. A method according to claim 1, wherein the matrix comprises a structural adhesive.

6. A method according to claim 1, further comprising providing an additional adhesive, wherein the adhering of the fairing to the spar cap is carried out at least in part by the additional adhesive.

7. A method according to claim 1, wherein the matrix is non-foaming.

8. A method according to claim 1, wherein the compressible solid is deformed by compression.

9. A method according to claim 8, wherein the compressible solid is approximately 20% thicker than the space between the spar cap and the fairing when the compressible solid is in an uncompressed state.

10. A method according to claim 8, wherein the compressible solid comprises a first porous layer facing the fairing and a second porous layer facing the spar cap, the first and second porous layers being separated by a third layer which has a greater thickness and a lower density than the first and second layers.

11. A method according to claim 10, wherein the first and second layers are woven fibrous layers.

12. A method according to claim 10, wherein the third layer is formed of fibers which are woven or stitched between the first and second layers.

13. A method according to claim 10, wherein the solid is impregnated with the matrix prior to the step of applying the composite between the spar cap and the fairing.

14. A method according to claim 1, wherein the blade is at least 45 meters in length.

15. A wind turbine blade comprising:
a spar with at least one spar cap;
a fairing positioned over the spar cap; and
a composite which substantially fills a space between the spar cap and the fairing,
wherein the composite comprises a cured matrix, a compressed solid and a void volume of at least 20%, the void volume absent of the matrix and the compressible solid.

16. A wind turbine blade according to claim 15, wherein the void volume is of at least 30%.

17. A wind turbine blade according to claim 15, wherein the compressible solid comprises a first porous layer facing the fairing and a second porous layer facing the spar cap, the first and second porous layers being separated by a third layer which has a greater thickness and a lower density than the first and second layers.

18. A wind turbine blade according to claim 17, wherein the first and second layers are woven fibrous layers.

19. A wind turbine blade according to claim 17, wherein the third layer is formed of fibres which are woven or stitched between the first and second layers.

20. A wind turbine blade according to claim 15, wherein the composite is arranged to adhere the spar cap to the fairing.

21. A wind turbine blade according to claim 15, further comprising an additional adhesive arranged to at least partially adhere the spar cap to the fairing.

22. A wind turbine comprising a wind turbine blade according to claim 15.

* * * * *